J. N. WHITEHOUSE.
CIGAR HOLDER CASE, PIPE CASE, OR SIMILAR RECEPTACLE.
APPLICATION FILED MAY 6, 1920.
1,417,121. Patented May 23, 1922.
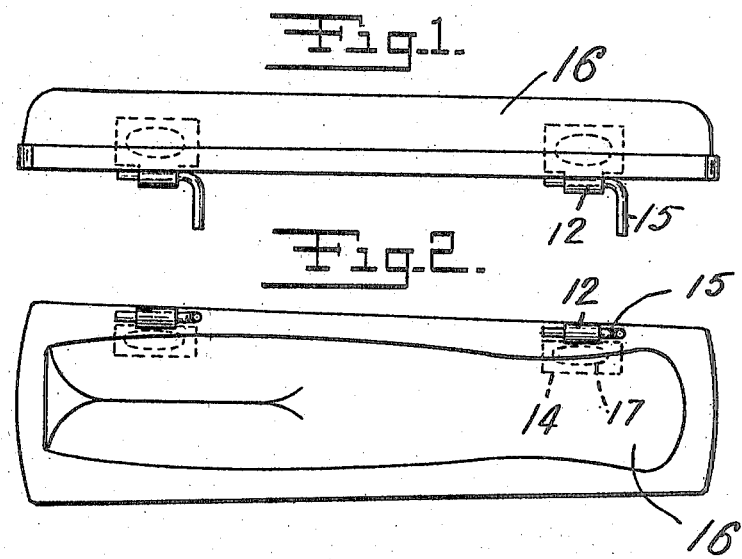
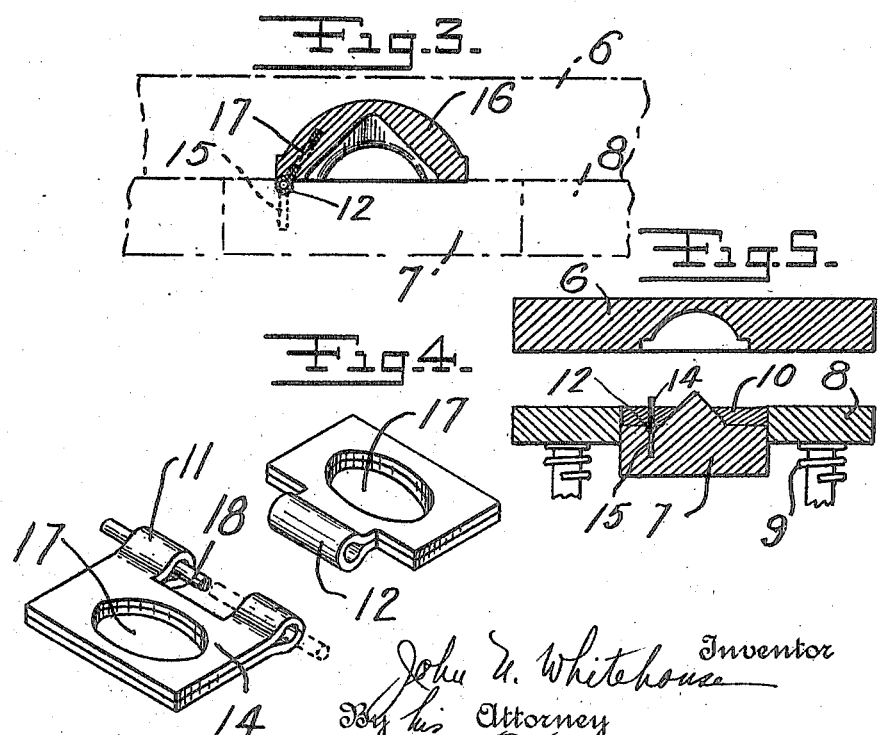
John N. Whitehouse, Inventor
By his Attorney
Frank J. Kent

UNITED STATES PATENT OFFICE.

JOHN N. WHITEHOUSE, OF NEW YORK, N. Y.

CIGAR-HOLDER CASE, PIPE CASE, OR SIMILAR RECEPTACLE.

1,417,121.   Specification of Letters Patent.   Patented May 23, 1922.

Application filed May 6, 1920. Serial No. 379,252.

*To all whom it may concern:*

Be it known that I, JOHN N. WHITEHOUSE, a citizen of the United States, residing at New York, in the county of New York and State of New York, have invented certain new and useful Improvements in Cigar-Holder Cases, Pipe Cases, or Similar Receptacles, of which the following is a specification.

This invention relates to improvements in cigar-holder cases, pipe cases or similar receptacles in which there are complementary parts, at least one of which is hollow, and which are hingedly connected.

Articles of this kind, as for instance, pipe cases, are now generally carved out of comparatively expensive natural wood, and the hinges nailed on, which requires an expensive and difficult operation, and results in the production of an article that breaks easily at and around the hinge.

One of the objects of the invention is to provide a concave article of compressed baked wood-powder with a hinge part anchored or binded in the edge portion thereof, the edge having anchorage or bonding portions formed and baked therein and the hinge part having anchorage or bonding portions interengaged with the anchorage portions of the edge.

A further object of the invention is to preliminarily form the hollow or concave section or sections of such an article by molding from a suitable material, such as a wood-powder mixture, and, as a part of the operation of baking the material and causing it to solidify into its molded form, to anchor or bond the body part of the hinge securely or entirely within the marginal edge portion of the section, with the eye of the hinge standing out from the edge of the wall, and preferably between the projections of the inner and outer surfaces of the wall, thereby to produce an article which is durable in the ordinary conditions of use, and which is very economical to manufacture.

Another object is to provide an improved form of hinge member which, by reason of its construction, may readily be formed with the necessary eye members to receive the pintle, and which lends itself to positive anchorage within the molded material.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claim.

In the accompanying drawing, which is to be taken as part of this specification, and in which I have shown merely a preferred form of embodiment of the invention, Figure 1 is a side elevation of one of the complementary members of a cigar-holder case; Figure 2 is a plan view of the same looking into the interior thereof; Figure 3 is a sectional view taken transversely through one of the members shown in Figures 1 and 2, illustrating the relation thereof to the mold in which it is formed and baked or solidified, the mold parts being also shown in section; Figure 4 illustrates in perspective the sort of hinge members which may be used on the complementary sections of the cigar-holder case illustrated in the other figures; and Figure 5 is a view similar to Figure 3, but showing the mold parts, the material to be molded and the hinge member, prior to the actual molding and baking operation.

Referring to the numerals on the drawing and particularly to Figures 3 and 5, the numeral 6 indicates the concave or female part of a mold such as may be utilized for pressing out a cigar-holder casing section such as is illustrated in Figures 1 and 2. The concave member of the mold is vertically movable, towards and away from a male convex member 7, which is stationary. 8 indicates a platform surrounding the male member 7, spring-pressed upwardly by means of springs 9 to the Figure 5 position, and capable of being moved downwardly when the concave member 6 of the mold moves down, as indicated in Figure 3. At suitable places on the molding surface of the male member 7, cut-outs are provided as indicated in Figures 3 and 5, to accommodate eye members 11 and 12 of the hinge pieces 14 shown in Figure 4. Assuming that the mold parts are in the Figure 5 position, a hinge member 14 is put in place, with its eye member, 11 or 12 seated in the cut-out of the member 7, and with the hinge plate itself extending upwardly, as indicated in Figure 5. Thereupon the material to be molded, which may be a suitable mixture of saw-dust and starch, with or without resin or the like, is placed on the convex die member 7, being confined laterally by the surrounding walls of the platform 8. In order that the material in the operation of molding may not be forced into the eyes 11 or 12, one arm of a right-angled pin 15 is passed through the eyes, the other arm of the pin being accommodated in a suitable aperture in the molding face of die member 7. The die member 6 is now depressed to the Figure 3 position driving the platform down head of it, and heat is applied to one or both dies, resulting in the molding of the material 10 into the form shown in Figure 3, with the hinge plate 14 entirely within and covered by the molded material, and with the eye portions 11 or 12 and the pins 15 standing out from the edge or rim of the concave molded article. Continued application of heat results in changing the molded mass into a solid rigid body, substantially homogeneous throughout, thoroughly baked around the embedded hinge body; and the hinge is so strongly and firmly bonded in position that it cannot be pulled out without actually breaking the article. When the molding and baking operations are complete the member 6 is again moved upwardly, whereupon the molded and baked article, indicated by the reference character 16, may be removed, the pins 15 being of course taken out of the eyes 11 or 12.

The particular molding apparatus illustrated may not be essential for the production of the article, but it is one that I have been led to develop as the result of the difficulties which stood in the way of producing, in a commercially practicable way, a hollow article from the wood-powder mixture specified, which material has to be brought to shape and then baked to render it coherent, homogeneous, solid and rigid; and supporting a hinge-member in the proper relation during the operations of forming and baking the material, so that the body of the hinge will be embedded in the wall of the article adjacent the rim, with the eye of the hinge projecting at all times from the rim and protected against contact with the material, so that the eye may not be clogged.

An excellent form of hinge part is shown in Figure 4, and comprises in each case a plate doubled flat upon itself and provided with a through-opening 17 in that part of the plate which is embedded in the molded article, so that the material as it is molded, passes through this opening 17 from both sides of the plate and unites to firmly bond the part in position. The doubled edge of the hinge plate is cut in the one case to form a single eye 12, and in the other case to form two spaced eyes 11, between which the eye 12 may be accommodated, after which a hinge pin 18 is passed through all of the eyes, to hold the complementary parts of the receptacle together. It will be understood that one part of the cigar-holder case will have hinge members with eyes 12, while the other complementary part of the cigar-holder case will have hinge plates with eyes 11; and of course provision will be made in the mold part 7 for accommodating the projecting eyes, according as they are single eyes 12 or spaced eyes 11.

I prefer to make the hinge parts as shown in Figure 4 because I am thus enabled to produce hinges of which the eyes, which are the only visible parts on the completed articles, have a finished appearance; and the fact that each hinge plate is made of a single piece which is doubled upon itself gives the plate a better anchorage or bond than if a single thickness of material were used. If a plate of single thickness were employed, it would have to be thin in order to allow of the turning of the eye parts, and manifestly a thin plate would readily pull out. With my construction I am enabled to use thin stock, readily bent to form the eyes and yet the doubled portion which is anchored in the molded material will be thick enough to afford good anchorage, particularly in connection with the bonding apertures 17.

It will be apparent that instead of anchoring or bonding the hinge plates in the article as part of the molding operation, I may first mold and bake the article, and provide it with suitable cavities on opposite sides of the edge wall, and then provide a bifurcated hinge-member with offset parts at the ends of the bifurcations to engage the edge of the article at the junction of the bifurcations. But in this case also the article will have baked therein the portions which interlock with corresponding portions of the hinge body.

The wood-powder mixture which I have found to be well adapted for purposes of the present invention consists of fifty parts more or less by weight of saw-dust; fifty parts more or less of starch; ten parts dilute solution of silicate of soda in soapy water, and three parts resin. This mixture forms readily in desired shapes, does not stick to the mold, expands under the continued application of heat after the mold parts have come together, and does not warp after the article is completed.

Inasmuch as many changes could be made in the above construction, and many apparently widely different embodiments of my invention could be made without departing from the scope thereof, it is intended that all matter contained in the above description or shown in the accompanying drawing shall be interpreted as illustrative and not in a limiting sense.

It is also to be understood that the language used in the following claim is intended to cover all the generic and specific features of the invention herein described and all statements of the scope of the invention which, as a matter of language, might be said to fall therebetween.

I claim:—

As a new article of manufacture, a receptacle and a cover therefor both composed of compressed baked wood-powder, cooperating hinge plates having their body portions arranged respectively within the walls of the receptacle and the cover with eyes of the plates projecting beyond the end surfaces of said walls, the walls of the receptacle and cover being first compressed and thereafter baked around the hinge members, and a connection between the eyes of the hinged plates.

In testimony whereof I affix my signature in presence of two witnesses.

JOHN N. WHITEHOUSE